United States Patent
Masood et al.

(10) Patent No.: US 11,361,252 B1
(45) Date of Patent: Jun. 14, 2022

(54) METHODS AND SYSTEMS FOR USING REINFORCEMENT LEARNING

(71) Applicant: THE BOSTON CONSULTING GROUP, INC., Boston, MA (US)

(72) Inventors: Muhammad Arjumand Masood, Cambridge, MA (US); Arun Karthik Ravindran, Somerville, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 17/114,226

(22) Filed: Dec. 7, 2020

Related U.S. Application Data

(60) Provisional application No. 62/944,058, filed on Dec. 5, 2019.

(51) Int. Cl.
*G06N 20/00* (2019.01)
*G06Q 30/02* (2012.01)

(52) U.S. Cl.
CPC ......... *G06N 20/00* (2019.01); *G06Q 30/0201* (2013.01); *G06Q 30/0211* (2013.01)

(58) Field of Classification Search
CPC .................................................... G06N 20/00
See application file for complete search history.

(56) References Cited

U.S. PATENT DOCUMENTS

| | | | |
|---|---|---|---|
| 7,827,060 B2 | 11/2010 | Wright et al. | |
| 9,589,278 B1* | 3/2017 | Wang ................. | G06Q 30/0275 |
| 2002/0062245 A1 | 5/2002 | Niu et al. | |
| 2005/0071223 A1 | 3/2005 | Jain et al. | |
| 2008/0249844 A1 | 10/2008 | Abe et al. | |
| 2019/0139092 A1* | 5/2019 | Nomula ............. | G06Q 30/0255 |

OTHER PUBLICATIONS

Lohtia, R., N. Donthu, and I. Yaveroglu, "Evaluating the efficiency of Internet banner advertisements", J. Business Research 60, 2007, pp. 365-370. (Year: 2007).*
Tejasophon, Pat. "Prepaid calling card online store." MS Thesis, Assumption University of Thailand, Jul. 2003. 106 pages. (Year: 2003).*
Steindór Sæmundsson, Katja Hofmann, Marc Peter Deisenroth, "Meta Reinforcement Learning with Latent Variable Gaussian Processes". arXiv:1803.07551 (Jul. 7, 2018). 11 pages. (Year: 2018).*
U.S. Appl. No. 16/204,321 dated Mar. 15, 2022.
U.S. Appl. No. 16/204,321 dated Apr. 26, 2022 from Mar. 15, 2022 to Apr. 26, 2022.

* cited by examiner

*Primary Examiner* — Vincent Gonzales
(74) *Attorney, Agent, or Firm* — DLA Piper LLP (US)

(57) ABSTRACT

Methods and Systems for using reinforcement learning to optimize promotions. A promotion can be offered to a customer for a prepaid calling card using a reinforcement learning model with a sensitivity parameter. The reinforcement learning model can estimate a time period during which the customer will purchase the prepaid calling card. The customer's reaction to the promotion can be observed. A reward or a penalty can be collected based on the customer's reaction. The reinforcement learning model can be adapted based on the reward or the penalty to optimize the timing of the promotion by estimating a new time period during which the customer will purchase the prepaid calling card. The reward proxy and/or the penalty proxy can comprise frequency of usage.

20 Claims, 10 Drawing Sheets

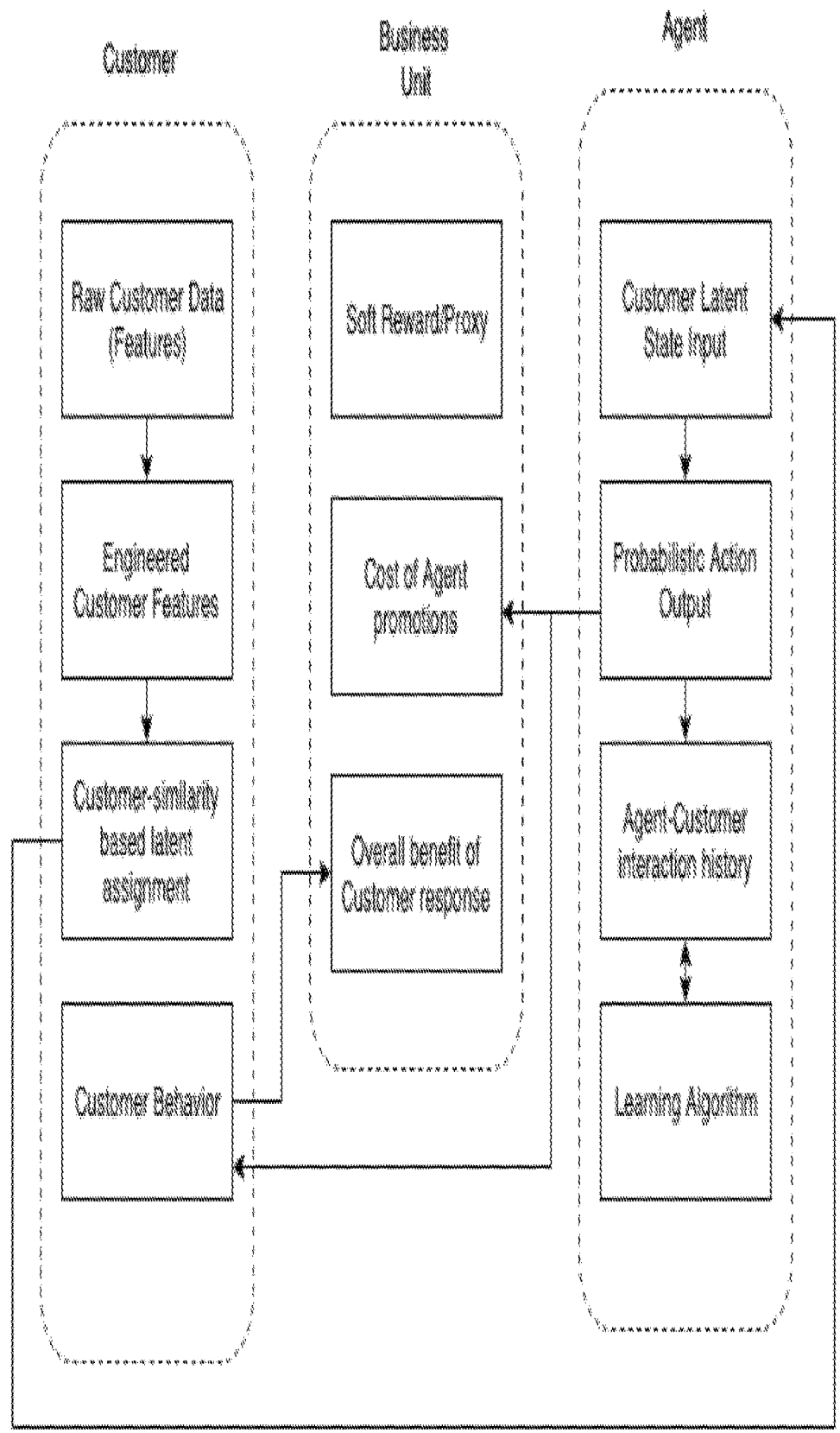

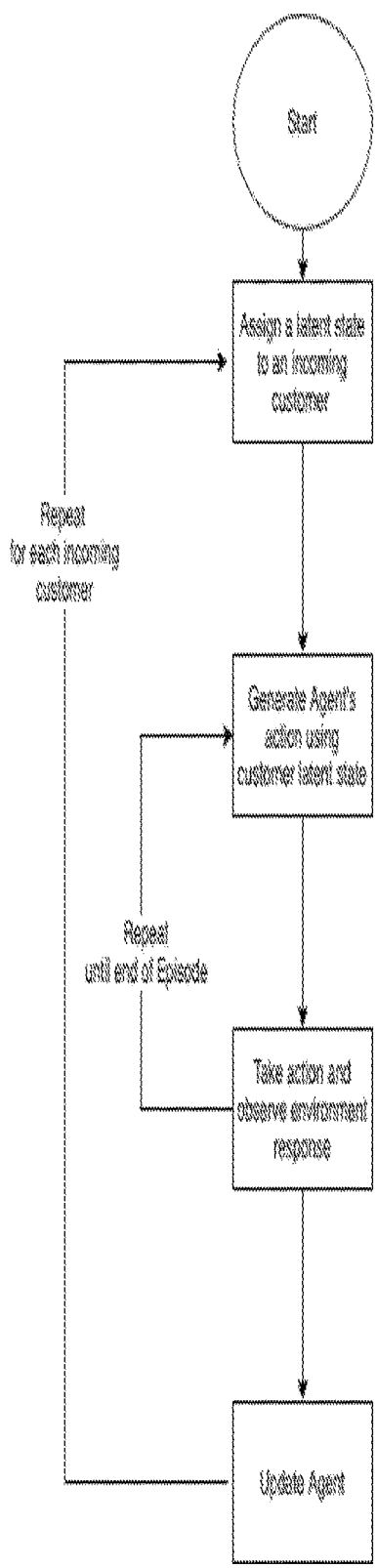

Figure 3: Customer Latent States
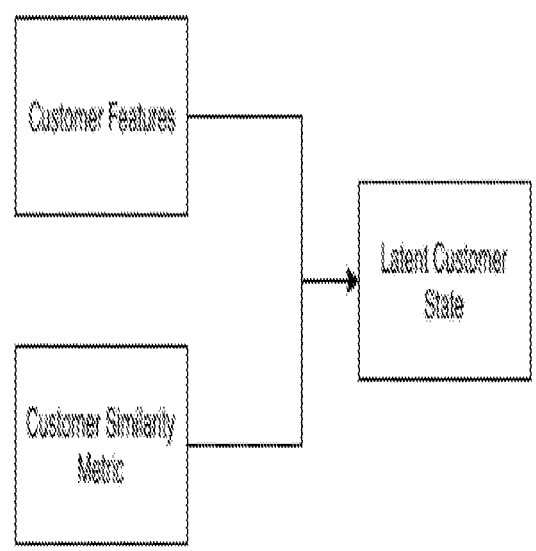

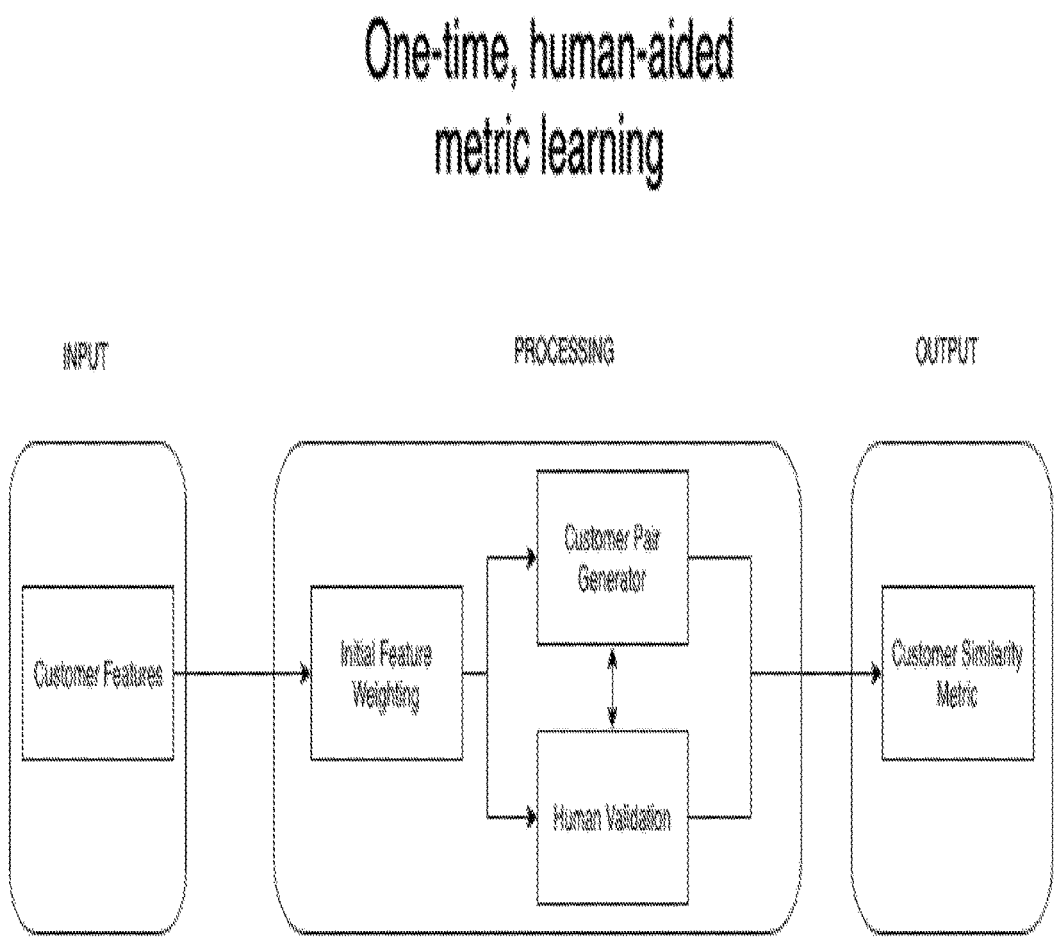

Figure 5: Customer Latent States Embedding Algorithm

Procedure Customer Latent States Embedding (Customers, Expert Input, All Customers)

Requires:
    Customers C={c1,c2,...,cN}, each customer with F features (for training)
    Expert (human) input
    All Customers C_all = {c1,c2,...cA}

Process:
    metric M_C ← LearnCustomerSimilarity(Customers, Expert Input)
    CustomerEmbedding ← LearnCustomerEmbedding(c_i, Customers, M_C)

for each customer c_i in C_all:
        s_i ← Predict Customer Embedding(c_i, ClusterEmbedding)

Output Latent State Embeddings {s1,s2,...sA} for each all customers, and embedding method for predicting state of any new customer Figure 5a: Customer Similarity Learning Sub-Procedure Sub-Procedure LearnCustomerSimilarity(Customers, Expert Input)

Requires:
    Customers $C=\{c1,c2,...,cN\}$, each customer with F features (for training)
    Expert (human) input Process:
    Initialize weightings: $w = [w1,w2,...wF]$ with Expert input
    Learn initial customer metric M_C defined by Positive Definite Matrix with diagonal w
    while Expert not satisfied
        Generate N_P random customer pairs: $c\_P = \{(ci,cj)\}\_n=1$ to N_P
        Record Expert Similarity: $s\_E = \{s\_ij\}n\_i$ to N
        Update metric weightings:
        MSS ← compute metric similarity for each pair
        discrepancy ← | MSS - s_E |
        w ← Perform gradient descent update on discrepancy w.r.t to weights Output metric M_C defined by Positive Definite Matrix with diagonal given by weights w Figure 5b: Customer Embedding Learning Sub-Procedure Sub-Procedure LearnCustomerEmbedding(Customers, M_C)

Requires:
    Customers C={c1,c2,...,cN}, each customer with F features (for training)
    Customer Similarity Metric M_C Process:
    ClusterEmbedding ← Use a clustering algorithm that allows custom metric M_C as input (e.g. K-means)

Output ClusterEmbedding

Figure 5c: Customer Latent Embedding (State) Prediction Sub-Procedure

Sub-Procedure Predict Customer Embedding($c\_new$, ClusterEmbedding)

Requires:
    Customer features: $c\_i$
    Metric-based clustering: ClusterEmbedding Process:
    For any new customer $c\_i$, predict cluster/state embedding using the learned clustering
    $s\_i \leftarrow$ ClusterEmbedding($c\_i$)

Output Latent state embedding $s\_i$ for customer with features $c\_i$

Figure 6: Reinforcement Learning: Detailed Algorithm

Procedure QLearning($S, A, R, T, \alpha, \gamma, \epsilon$)

Requires:
    Customer States $S = \{s1, s2, ..., sK\}$
    Actions space $A = \{\Phi 1, \Phi 2, ..., \Phi m\}$
    Reward function $:S \times S \times A \to \mathbb{R}$
    Stochastic transition function $T:S \times A \to S$ (dictated by the customer behavior described in the framework above)
    Learning rate $\alpha \in [0,1]$
    Discounting factor $\gamma \in [0,1]$
    Exploration factor $\epsilon \in [0,1]$ Process:

Initialize $Q:S \times A \to \mathbb{R}$ to a zero matrix
Start in state $s \in S$
While $Q$ is not converged do
    If $U(0,1) < \epsilon$
        Choose action $a* \in A$ randomly
    Else
        Choose $a* = \arg\max\_a\, Q(s,a)$
    Compute the new state $s' \leftarrow T(s, a*)$
    Compute the reward $r \leftarrow R(s, s', a*)$
    Update the Q matrix: $Q(s,a) \leftarrow (1-\alpha)Q(s,a) + \alpha\,(r + \gamma \max\_a' Q(s', a'))$
    Update state $s \leftarrow s'$ Output: Q matrix which gives the value of each action a for a customer in a state s. When deploying the RL agent, we choose the action $a^* = \arg\max\_a\, Q(s,a)$

METHODS AND SYSTEMS FOR USING REINFORCEMENT LEARNING

CROSS-REFERENCE TO RELATED APPLICATIONS

This application claims the benefit of U.S. Provisional Application No. 62/944,058 filed Dec. 5, 2019. This application is also related to U.S. Provisional Application No. 62/744,508 filed Oct. 11, 2018, and U.S. application Ser. No. 16/204,321 filed on Nov. 29, 2018. The entirety of all of these applications (62/944,058; 62/744,508; and Ser. No. 16/204,321) are incorporated by reference in their entirety.

BRIEF DESCRIPTION OF THE FIGURES

FIG. 1 illustrates a system for using reinforcement learning for promotions, according to aspects of the disclosure.

FIG. 2 illustrates a method for using reinforcement learning for promotions, according to aspects of the disclosure.

FIG. 3 illustrates a sub-process for the agent learning system: customer latent states, according to aspects of the disclosure.

FIG. 4 illustrates a sub-process for the agent learning system: human-aided metric learning for defining the customer latent states, according to aspects of the disclosure.

FIG. 5-5c detail a customer latent embedding procedure, according to aspects of the disclosure.

FIG. 6 details an overall learning procedure, according to aspects of the disclosure.

AI-Enabled Decision Making

Figure 7:
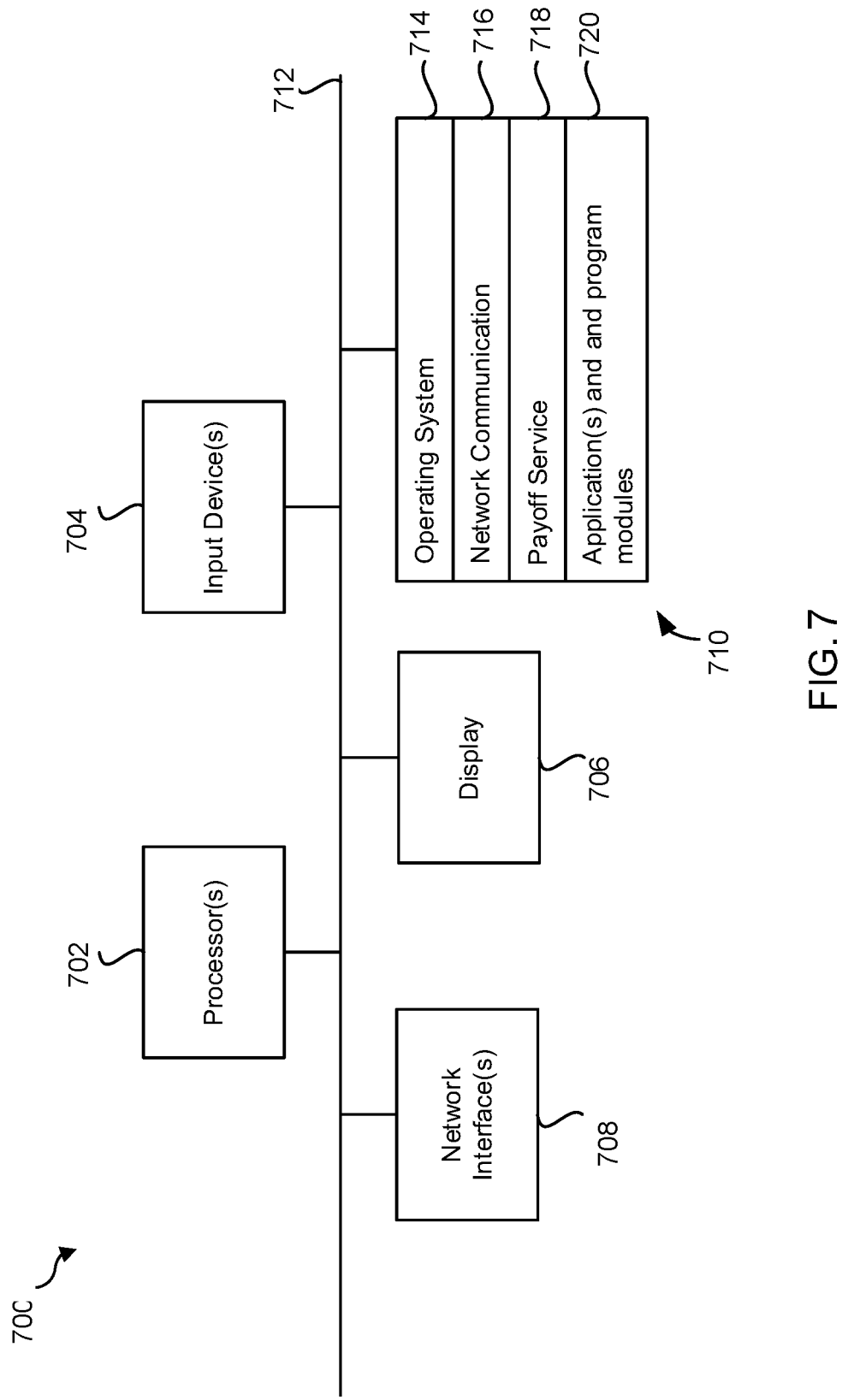
FIG. 7 is a block diagram of an example computing device, according to aspects of the disclosure.

Artificial intelligence (AI)-enabled sequential decision-making agents can have many applications. Reinforcement learning algorithms can help with these new developments. However, deploying such an AI agent may not be trivial and what may work in one application area may not directly generalize to different practical application areas. We therefore need to devise methods to 1) appropriately transform existing data and problem-structure into an AI-friendly format, and 2) appropriately tailor the algorithmic learning procedure to the task at hand. To this end, we provide a specific application context (e.g., telecommunications promotions) and provide specific implementations to address this practical application. 1) a method to dynamically sort/group together customers (e.g., using raw data) for improved/targeted advertising strategy. 2) A process of incorporating application-specific proxies for reward function to improve agent learning process.

Transforming Data and Problem-Structure Using Dynamic Customer Latent Allocations The format of our raw data (e.g., telecom customer information) can include a combination of discrete and continuous data, such as: demographic features, financial background, or product engagement statistics (e.g., frequency, duration, or location, of phone calls made), or any combination thereof. It may not be possible to use a tabular reinforcement learning method such as Q-learning as an out-of-the-box technique for a feature space that has continuous variables. One workaround example is to discretize the continuous features. However in this case, there may be too many states (e.g., combinatorial explosion due to each type of feature and the number of bins in it) for training to be viable. Another alternative technique could be Deep Q-learning. However, this approach has its challenges, including requiring a lot of training data and guaranteeing optimality.

In this disclosure, we discuss an example approach that can form subsets of the customer population (e.g., based on its features) such that the subsets represent states that can be influenced in similar manners via promotions.

Tailor Algorithmic Learning Using Proxies

An agent, whose task may be to maximize the efficacy of promotions and ads it is generating relative to a defined reward function, can be trained to perform optimally (e.g., given data). In the context of promotions, the reward function can be defined to be the revenue net costs associated with the promotion. The agent can implicitly infer the probability distribution underlying the customer's purchasing behavior, and/or the impact of promotions on this distribution, in order to suggest actions (e.g., interventions) designed to maximize expected long-term rewards (and therefore profit). We can further tailor the algorithmic learning procedure using proxies for the reward to go beyond revenue to include signals that are correlated with revenue (e.g. increased frequency of card usage and customer referring friends)

FIG. 1 illustrates a system for using reinforcement learning for promotions, according to aspects of the disclosure. A customer component can include customer behavior (e.g., such as whether the promotion was redeemed) as well as raw data (e.g., customer demographic, past purchase history) and processed data (e.g., latent customer embedding). Combined with the business unit, which can keep track of the profits and losses associated with the promotions and customer behavior, we can train the learning agent component. Through frequent interaction between these three components and the goal of optimizing the profits as determined by the business unit, the agent can learn to predict which promotions to offer the customer and can keep a record of the agent-customer interactions. FIG. 2 illustrates a method for using reinforcement learning for promotions, according to aspects of the disclosure. An episode can begin when an incoming customer is first assigned a latent state (see e.g., FIGS. 3, 4, 5 for details). In turn, the agent can enter a loop where it can generate an action (e.g., using the customer's observed latent state as input) and can record an observation of the environment response (e.g., including a new latent state of customer and/or reward signal). The length of this episodic loop can be fixed (e.g., at one month of interactions, or any other length). The system user can choose to define episode length separately. The observations from each episode can be subsequently used to train an agent designed to find an optimal policy using Reinforcement Learning.

FIG. 3 can illustrate a sub-process for the agent learning system that can outline the way raw customer data is processed into an AI friendly format, using a customer similarity metric (e.g., see FIGS. 4 and 5 for details) to obtain a latent state. The latent state can be important because it can define the state-space of the Markov Decision Process (MDP) we formulate for addressing the telecom personalization problem using reinforcement learning.

FIG. 4 illustrates an example sub-process for the agent learning system: human-aided metric learning. Using the raw customer inputs, and/or a set of feature weightings (e.g., auto-generated or human expert generated), pairs of customers, potentially along with their similarity index can be generated. A human user can then validate or invalidate these pairs. This process can be iterative and the weightings can be updated so that the human validation increases over time. The weightings that are obtained using this method can form a metric (e.g., corresponding to the positive definite matrix with the weights on the diagonal) that can be subsequently used to cluster customer features into discrete states for the reinforcement learning algorithm.

FIGS. 5-5c detail a customer latent embedding procedure, according to aspects of the disclosure. This procedure can comprise two sub-procedures, one that learns a customer similarity metric (e.g., requires inferring appropriate weights using human input) and/or one that learns a latent customer embedding (e.g., using the customer similarity)

FIG. 6 details the overall learning procedure, according to aspects of the disclosure. This can be a classic reinforcement learning algorithm (Q-Learning) applied to a new problem domain, and can require as input an appropriate problem formulation (e.g., state, action, transition, reward, discount). The optimal policy can then be learned using any combination of these problem-specific inputs. The method described herein can allow for the ideal balance between personalization and/or data-driving decision-making. An example down-side to ultra-personalization (e.g., treating each individual for the learning task separately) can be that there is a scarcity of data for algorithms to learn from. An example down-side however to combining data from too many customers can be that meaningful differences in customer behavior may get lost and a one-size-fits-all marketing strategy can be ineffective.

The goal of reinforcement learning can be to discover effective sequential decision making strategies. Combining this, in some aspects, with a problem formulation for telecommunications marketing, can allow us to build AI that can learn complex, personalized marketing strategies including a mix of discount and non-discount promotions as well as strategic decisions on the timing a promotion is offered.

Formulation

A Markov Decision Process (MDP) can be defined herein by state, action, transition, reward or discount, or any combination thereof. In applied work, the way an MDP is defined for a reinforcement learning problem can help with its success and/or deployability. For example, in some aspects we include a component for specifying the state space of an MDP in the telecommunications marketing application area and/or a reward-shaping technique.

State Space

One example aspect of this disclosure is the state-space formulation. The raw customer features can be transformed into a discrete state space (e.g., see FIGS. 3, 4, 5). We have a method that learns the appropriate number of states (e.g., DBSCAN-based clustering), and/or the appropriate metric for differentiating across states (e.g., metric).

Action Space

One sample formulation of the action space can involve any of the following three actions:
1) No Promotion
2) Provide free minutes for refilling current plan
3) Provide discount for buying new plan The timing for the agent to execute one of these (or different) actions can be user-dependent. In some marketing settings, the promotion offers can be made at pre-defined moments to a pre-defined set of people. In some aspects of the disclosure, an alternative method can be used where offers are made in a stochastic manner, when a customer is engaging with the product (e.g., making a call using a calling card).

Transition

The transition between states does not need to be modelled, but rather observed, as customers respond to actions.

Reward

A traditional reward formulation can be to provide a positive reward whenever a discount is redeemed. This can lead to a scarce reward signal and/or can make it difficult to capture how credit assignment should take place. For example, it can be unclear what the impact of previous promotions, etc. are on the customer, and we may not want to associate the customer's behavior only as an immediate result to a single promotion. The longer term subtle affects may not be captured in such a reward structure. We therefore propose a reward function that can also add a positive signal (e.g., proxy) for behavior that correlates with increased revenue. Examples of such behavior includes (but is not limited to) enhanced usage of calling cards (both in terms of frequency and duration) as well as customer referrals to friends.

Discount

A discount factor for reinforcement learning problems can be set to any value, for example 0.99. The discount factor can be a user-determined parameter and/or can be determined in accordance with the time validity of the customer's current calling card.

Additional Examples

Methods and systems of using reinforcement learning to optimizing promotions can include, in some embodiments, any or all of the following: offering a promotion to a customer for a prepaid calling card using a reinforcement learning model with a sensitivity parameter, the reinforcement module estimating a time period during which a customer will purchase the prepaid calling card; observing the customer's reaction to the promotion; collecting a reward or a penalty based on the customer's reaction; and adapting the reinforcement learning model based on the reward or the penalty to optimize the timing of the promotion by estimating a new time period during which the customer will purchase the prepaid calling card.

In some aspects of the disclosure, the reward or penalty can include a reward proxy or a penalty proxy indicating that the customer is responding to the promotion. The reward proxy can include the customer using the prepaid card more often. The penalty proxy can include the customer using the prepaid card less often. The reward proxy and/or the penalty proxy can include frequency of usage. Sales of prepaid cards can be increased using promotions, even though little information is available related to the customer. The learning reinforcement model can utilize a customer latent embedding procedure.

Example Computer Elements

FIG. 7 is a block diagram of an example computing device 700 that may be utilized to execute embodiments to implement methods or processes including various features and functional operations as described herein. For example, computing device 700 may function as server device and/or a user device or a portion or combination thereof. The computing device 700 may be implemented on any electronic device to execute software applications derived from program instructions, and may include, but is not limited to: personal computers, servers, smartphones, media players, electronic tablets, game consoles, email devices, etc. In some implementations, the computing device 700 may include one or more processors 702, one or more input devices 704, one or more display devices or output devices 706, one or more communication interfaces 708, and/or memory 710. Each of these components may be coupled by bus 712, or in the case of distributed computer systems, one or more of these components may be located remotely and accessed via a network.

Processor(s) 702 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input devices 704 may be any known input devices technology, including but not limited to a keyboard (including a virtual keyboard), mouse, track ball, and touch-sensitive pad or display. To provide for interaction with a user, the features and functional operations described in the disclosed embodiments may be implemented on a computer having a display device 706 such as a CRT (cathode ray tube) or LCD (liquid crystal display) monitor for displaying information to the user and a keyboard and a pointing device such as a mouse or a trackball by which the user can provide input to the computer. Display device 706 may be any known display technology, including but not limited to display devices using Liquid Crystal Display (LCD) or Light Emitting Diode (LED) technology.

Communication interfaces 708 may be configured to enable computing device 700 to communicate with other another computing or network device across a network, such as via a wired connection, a wireless connection, or a combination of wired and wireless connections. For example, communication interfaces 708 may include an Ethernet interface, an optical interface, a coaxial interface, an infrared interface, a radio frequency (RF) interface, a universal serial bus (USB) interface, a Wi-Fi interface, a cellular network interface, or the like.

Memory 710 may be any computer-readable medium that participates in providing computer program instructions and data to processor(s) 702 for execution, including without limitation, non-transitory computer-readable storage media (e.g., optical disks, magnetic disks, flash drives, etc.), or volatile media (e.g., SDRAM, ROM, etc.). Memory 710 may include various instructions for implementing an operating system 714 (e.g., Mac OS®, Windows®, Linux). The operating system 714 may be multi-user, multiprocessing, multitasking, multithreading, real-time, and the like. The operating system 714 may perform basic tasks, including but not limited to: recognizing inputs from input devices 704; sending output to display device 706; keeping track of files and directories on memory 710; controlling peripheral devices (e.g., disk drives, printers, etc.) which can be controlled directly or through an I/O controller; and managing traffic on bus 712. Bus 712 may be any known internal or external bus technology, including but not limited to ISA, EISA, PCI, PCI Express, USB, Serial ATA or FireWire.

Network communications instructions 716 may establish and maintain network connections (e.g., software applications for implementing communication protocols, such as TCP/IP, HTTP, Ethernet, telephony, etc.). Application(s) and program modules 720 may include software application(s) and different functional program modules which are executed by processor(s) 702 to implement the processes described herein and/or other processes. The program modules 720 may include but not limited to software programs, machine learning models, objects, components, data structures that are configured to perform tasks or implement the processes described herein. The processes described herein may also be implemented in operating system 714.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an server device or an Internet server, or that includes a front-end component, such as a user device having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and server devices. A user computing device and server may generally be remote from each other and may typically interact through a network. The relationship of user computing devices and server device may arise by virtue of computer programs running on the respective computers and having a client-server relationship to each other.

Communication between various network and computing devices 700 of a computing system may be facilitated by one or more application programming interfaces (APIs). APIs of system may be proprietary and/or may be examples available to those of ordinary skill in the art such as Amazon® Web Services (AWS) APIs or the like. One or more steps or operations of the disclosed embodiments may be implemented using an API. An API may define one or more parameters that are passed between a calling application and other software code (e.g., an operating system, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

Conclusion

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method of using reinforcement learning to optimizing promotions, comprising:
a computer device comprising a processor configured for:
offering a promotion to a customer for a prepaid calling card using a reinforcement learning model with a sensitivity parameter, the reinforcement learning model estimating a time period during which the customer will purchase the prepaid calling card;
observing the customer's reaction to the promotion;
collecting a reward or a penalty based on the customer's reaction; and
adapting the reinforcement learning model based on the reward or the penalty to optimize the timing of the promotion by estimating a new time period during which the customer will purchase the prepaid calling card;
wherein the reward proxy and/or the penalty proxy comprises frequency of usage.

2. The method of claim 1, wherein the reward or penalty comprises a reward proxy or a penalty proxy indicating that the customer is responding to the promotion.

3. The method of claim 2, wherein the reward proxy comprises the customer using the prepaid card more often.

4. The method of claim 2, wherein the penalty proxy comprises the customer using the prepaid card less often.

5. The method of claim 1, wherein the reinforcement learning model utilizes a customer latent embedding procedure.

6. The method of claim 1, wherein the reinforcement learning model utilizes a customer similarity metric.

7. The method of claim 1, further comprising:
receiving customer inputs and/or a set of feature weightings;
generating pairs of customers, wherein the pairs of customers can be validated by a user;
adapting the reinforcement learning model so that validation by the customer increases; and
outputting a customer similarity metric.

8. The method of claim 7, further comprising using the customer similarity metric to cluster customer inputs into discrete states for the reinforcement learning model.

9. The method of claim 8, wherein the method further comprises receiving customer inputs and/or a set of feature weightings, and generating pairs of customers, wherein the pairs of customers can be validated by a user.

10. The method of claim 9, wherein the method further comprises adapting the reinforcement learning model so that validation by the customer increases.

11. A system of using reinforcement learning to optimizing promotions, comprising:
a computing device comprising a processor configured for:
offering a promotion to a customer for a prepaid calling card using a reinforcement learning model with a sensitivity parameter, the reinforcement learning model estimating a time period during which a customer will purchase the prepaid calling card;
observing the customer's reaction to the promotion;
collecting a reward or a penalty based on the customer's reaction; and
adapting the reinforcement learning model based on the reward or the penalty to optimize the timing of the promotion by estimating a new time period during which the customer will purchase the prepaid calling card;
wherein the reward proxy and/or the penalty proxy comprises frequency of usage.

12. The system of claim 11, wherein the reward or penalty comprises a reward proxy or a penalty proxy indicating that the customer is responding to the promotion.

13. The system of claim 12, wherein the reward proxy comprises the customer using the prepaid card more often.

14. The system of claim 12, wherein the penalty proxy comprises the customer using the prepaid card less often.

15. The system of claim 11, wherein the reinforcement learning model utilizes a customer latent embedding procedure.

16. The system of claim 11, wherein the reinforcement learning model utilizes a customer similarity metric.

17. The system of claim 11, wherein the processor is further configured for:
receiving customer inputs and/or a set of feature weightings;
generating pairs of customers, wherein the pairs of customers can be validated by a user;
adapting the reinforcement learning model so that validation by the customer increases; and
outputting a customer similarity metric.

18. The method of claim 17, wherein the processor is further configured for using the customer similarity metric to cluster customer inputs into discrete states for the reinforcement learning model.

19. The method of claim 18, wherein the processor is further configured for receiving customer inputs and/or a set of feature weightings, and generating pairs of customers, wherein the pairs of customers can be validated by a user.

20. The method of claim 19, wherein the processor if further configured for adapting the reinforcement learning model so that validation by the customer increases.

\* \* \* \* \*